United States Patent
Huang et al.

(10) Patent No.: US 7,370,299 B2
(45) Date of Patent: May 6, 2008

(54) METHOD AND COMPUTER PROGRAM PRODUCT FOR REGISTER TRANSFER LEVEL POWER ESTIMATION IN CHIP DESIGN

(75) Inventors: Shi-Yu Huang, Taoyuan Hsien (TW); Kai-Shung Chang, Kaohsiung (TW); Chia-Chien Weng, Hsinchu (TW); Ming-Yi Sum, Taipei (TW)

(73) Assignee: National Tsing Hua University, Hsinchu (TW)

( * ) Notice: Subject to any disclaimer, the term of this patent is extended or adjusted under 35 U.S.C. 154(b) by 386 days.

(21) Appl. No.: 11/179,312

(22) Filed: Jul. 12, 2005

(65) Prior Publication Data
US 2006/0129957 A1    Jun. 15, 2006

(30) Foreign Application Priority Data
Dec. 15, 2004    (TW) .............................. 93138923 A (51) Int. Cl.
*G06F 17/50* (2006.01)
(52) U.S. Cl. .............................................. 716/4; 716/5
(58) Field of Classification Search ...................... None
See application file for complete search history.

(56) References Cited

U.S. PATENT DOCUMENTS 6,363,515 B1 *    3/2002    Rajgopal et al. ................ 716/5
6,735,744 B2 *    5/2004    Raghunathan et al. ......... 716/4

OTHER PUBLICATIONS

R.Ferreira et al., "Probabilistic Bottom-up RTL Power Estimation," 2000 IEEE 1st Int'l Symposium on Quality Electronic Design, pp. 439-446.*
S.Gupta et al., "Analytical Models for RTL Power Estimation of Combinational and Sequential Circuits," IEEE Trans. on CAD of ICs and Systems, vol. 19, No. 7, Jul. 2000, pp. 808-814.*
N.R.Potlapally et al., "Accurate Power Macro-modeling Techniques for Complex RTL Circuits," 2000 IEEE 14th Int'l Conference on VLSI Design, pp. 235-241.*
S.Ravi et al., "Efficient RTL Power Estimation for Large Designs," 2003 IEEE Proceedings of the 16th Int'l Conference on VLSI Design, 9 pages.*
Q.Wu et al., "Cycle-Accurate Macro-Models for RT-Level Power Analysis," IEEE Trans. on VLSI Systems, vol. 6, No. 4, Dec. 1998, pp. 520-528.*

* cited by examiner

*Primary Examiner*—Leigh M. Garbowski
(74) *Attorney, Agent, or Firm*—Ladas & Parry LLP (57) ABSTRACT

A method for register transfer level power estimation in chip design includes the steps of: (A) parsing all possible condition branches of conditional statements in a register transfer level code, and establishing power modes inducible by each of the possible condition branches; (B) selecting a plurality of representative input vector sets from input vector sets recorded in the chip specification, and constructing linear characterization formulas corresponding to the power modes based on the selected input vector sets; and (C) calculating power values from the linear characterization formulas that correspond to the power modes, and obtaining an average power consumed by the chip from the calculated power values.

12 Claims, 7 Drawing Sheets

F I G. 1
PRIOR ART

```
case(state)
  's0: if (start) begin
         next_u<=x1;next_v<=x2;next_state<='s1;
       end
  's1: if (u>v) next_u<=u-v;
       else next_state<='s2;
  's2: if (u==v) done<=1;GCD<=u;next_state<='s3;
       else next_v=v-u;next_state<='s1;
  's3: begin end
endcase
```

| Power mode | PM1 | PM2 | PM3 | PM4 | PM5 | PM6 | PM7 |
|---|---|---|---|---|---|---|---|
| Power mode occurrence | 1000 | 1000 | 2000 | 2000 | 1000 | 2000 | 1000 |
| Functional input vector set | 1000 | 1000 | 2000 | 2000 | 1000 | 2000 | 1000 |
| Selected input vector set | 5 | 5 | 10 | 10 | 5 | 10 | 5 |

F I G. 6

| Input signal | Affected logic gate input | Toggle count of logic gate output | Final Weight |
|---|---|---|---|
| $X_1$ (0→1) | 42, 43 | 2 | (2/5)*3=6/5 |
| $X_2$ (1→0) | 41, 42, 43 | 3 | (3/5)*3=9/5 |
| $X_3$ (1→1) | 41, 42, 43, 44, 45 | – | – |
| $X_4$ (0→0) | 43, 44, 45 | – | – |

F I G. 7

METHOD AND COMPUTER PROGRAM PRODUCT FOR REGISTER TRANSFER LEVEL POWER ESTIMATION IN CHIP DESIGN

CROSS-REFERENCE TO RELATED APPLICATION

This application claims priority of Taiwanese Application No. 093138923, filed on Dec. 15, 2004.

BACKGROUND OF THE INVENTION

1. Field of the Invention

The invention relates to a method and computer program product for power estimation, more particularly to a method and computer program product for register transfer level power estimation in chip design.

2. Description of the Related Art

With the increasingly complicated functionality of chips, the number of logic gates in a logic chip also increases quickly, thereby resulting in higher power consumption of the chip. Moreover, after the logic chip is implemented, the power consumption of the chip is oftentimes found not complying with system specifications, and requires repeated modification of the design of the internal components of the chip so as to obtain a chip with lower power consumption. However, considerable costs and time have to be spent at each implementation of the logic chip. Therefore, if the power consumption of a chip can be estimated in advance by a simulation method prior to implementation of the chip, the required implementation costs can be reduced effectively.

A conventional method for simulating the power consumption of a logic chip is to estimate the power consumption of the chip at the gate-level. The gate-level circuit of the logic chip is composed of a plurality of logic gates, and the toggle count of output signals at the logic gates is correlated to the power consumption of the chip. Therefore, by compiling statistics of the switching activity of the output signal at each logic gate, the power consumption of the chip can be obtained.

The output signals at the logic gates are switched because the input signals inputted into the logic chip will change with clock cycles. Therefore, once the input signals change, the outputs of the logic gates of the logic chip will also vary.

Figure 1:
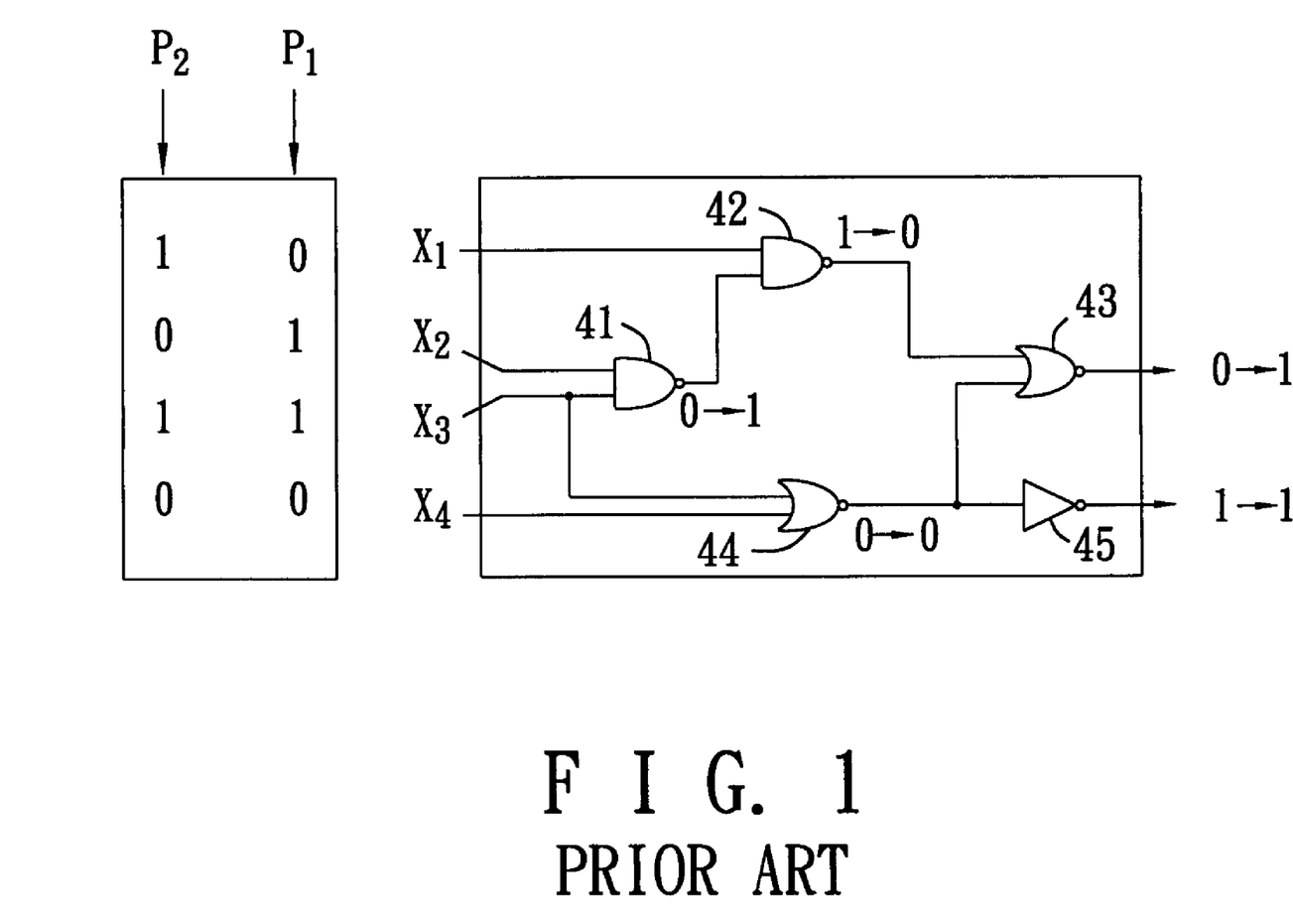
FIG. 1 is a gate-level circuit diagram of a chip, illustrating that switching activity of each input signal may effect different logic gate switching.

To illustrate using an example, reference is made to FIG. 1, which shows a gate-level circuit inside a chip. The gate-level circuit includes a first NAND gate 41, a second NAND gate 42, a first NOR gate 43, a second NOR gate 44, and a NOT gate 45.

The logic chip can receive an input of four signals $x_1$, $x_2$, $x_3$ and $x_4$. The value of each of these input signals may be 0 or 1, and may vary with different clock cycles. For the sake of illustration, an input vector $p_i = [x_1, x_2, x_3, x_4]$ is used to represent the value of each of the input signals $x_1$, $x_2$, $x_3$ and $x_4$ during the ith clock cycle.

During the first clock cycle, the input vector is $p_1$, and the value thereof is [0, 1, 1, 0]. Besides, at this stage, the output of the first NAND gate 41 is 0; the output of the second NAND gate 42 is 1; the output of the first NOR gate 43 is 0; the output of the second NOR gate 44 is 0; and the output of the NOT gate 45 is 1.

After the first clock cycle, i.e., during the second clock cycle, the input vector $p_1$ switches to $p_2$, and the value of $p_2$ is [1, 0, 1, 0]. At this stage, since the input signal switches, the output of the first NAND gate 41 will switch from 0 to 1, the output of the second NAND gate 42 will switch from 1 to 0, and the output of the first NOR gate 43 will switch from 0 to 1, whereas the outputs of the second NOR gate 44 and the NOT gate 45 will not switch.

The fan-out of an input signal $x_j$ refers to the logic gates that may be affected when the input signal $x_j$ switches. As shown in FIG. 1, when the input signal $x_1$ switches, the outputs of the second NAND gate 42 and the first NOR gate 43 may be caused to effect switching. When the input signal $x_2$ switches, this may cause the outputs of the first NAND gate 41, the second NAND gate 42, and the first NOR gate 43 to switch. Switching of the input signal $x_3$ may cause the outputs of the first NAND gate 41, the second NAND gate 42, the first NOR gate 43, the second NOR gate 44, and the NOT gate 45 to switch. Similarly, switching of the input signal $x_4$ may cause the outputs of the first NOR gate 43, the second NOR gate 44, and the NOT gate 45 to switch. Therefore, when the first clock cycle switches to the second clock cycle, the logic gates of the logic chip have a total toggle count of 3. Thus, by computing the number of switching activities that occurred at the logic gates, the power consumption of the logic chip under these two input vectors can be inferred.

However, it should be noted that there are many ways of switching the input vector $p_1$ during the next clock cycle. In particular, the input vector $p_2$ is not limited to [1,0,1,0], and may have 16(=$2^4$) possibilities, including [0, 0, 0, 0], [0, 0, 0, 1], and [0, 0, 1, 0]. In addition, during the first clock cycle, the value of $p_1$ is also not limited to [0, 1, 1, 0] as mentioned above. Therefore, two input vectors of any two clock cycles may have many possible combinations, and some specific combinations may enable the logic chip to execute specific functions. For instance, switching from one input vector [0, 0, 0, 1] to [1, 1, 1, 1] may represent that the logic chip is being switched to a power-save mode, whereas switching from one input vector [1, 0, 0, 0] to [1, 1, 1, 0] may represent that the logic chip is executing a logic operation, such as multiplication.

However, if the input vector switches from [0, 0, 0, 0] to [1, 1, 1, 1], and this switching activity does not activate the logic chip, such change in the input vector has no meaning for the logic chip. When estimating the power consumption of a chip, all the meaningful input vector switching activities of the logic chip have to be considered so as to obtain a value that can represent the average power consumption of the logic chip.

Although estimation of the power consumption of the chip at the gate level of the chip has a high accuracy, as the input at the gate level of the chip will have a large number of input signals and will not be having only four input signals as in FIG. 1, simulation performed at this level will be very time-consuming due to consideration of the activities of such a large number of input signals.

To describe the internal circuitry design of a chip, apart from using gate level as a basis, the register transfer level (hereinafter referred to as RT-level), a higher level, can also serve as the basis. At the RT-level, a register transfer level code (hereinafter referred to as RTL code) is used to describe the internal circuitry design of the chip. In this RTL code, an input vector $q_i = [x_1, x_2, \ldots, x_{n-1}, x_n]$ can also be used to describe the values of all the signals $x_1, x_2, \ldots, x_{n-1}, x_n$ of the RTL code during the ith clock cycle.

Figure 2:
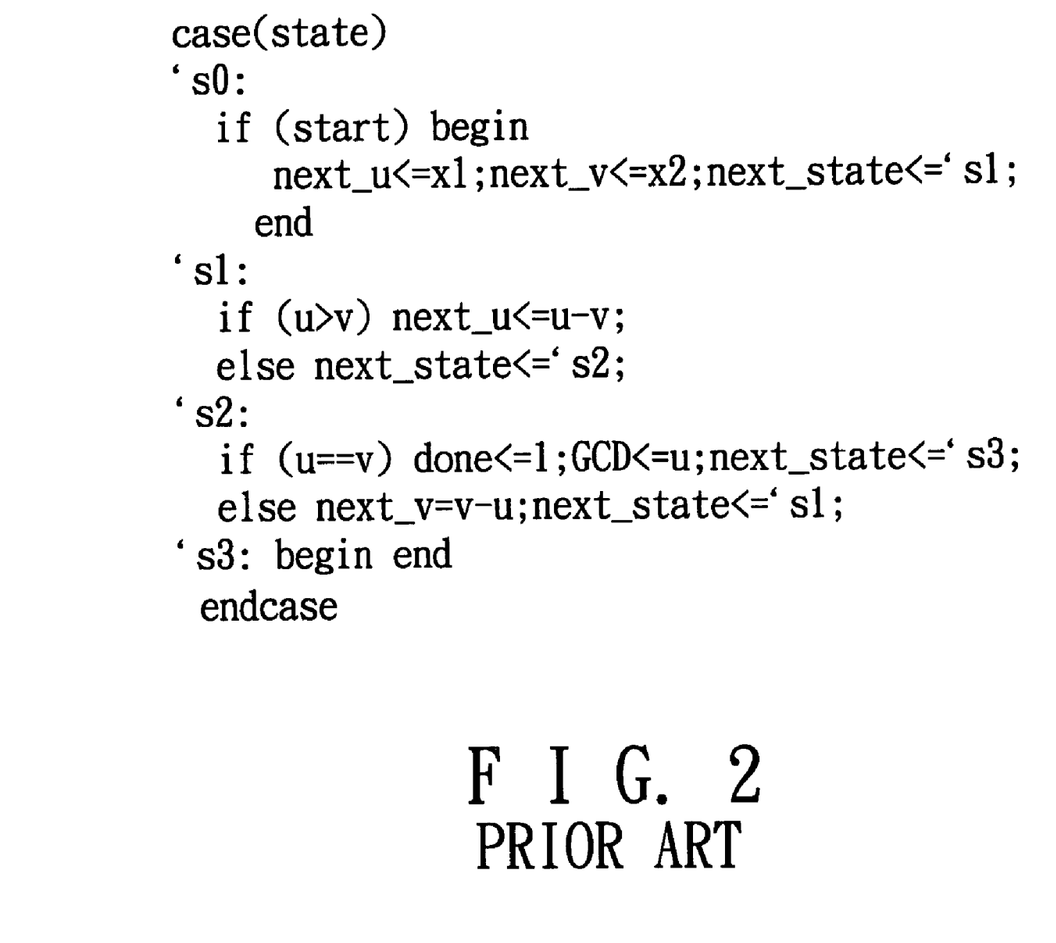
FIG. 2 is an RTL code of a chip, illustrating that the register transfer level code has different conditional statements.

FIG. 2 lists a typical RTL code written using Verilog programming language. The illustrative RTL code is primarily used to calculate the greatest common divisor (GCD) of two integers u, v. In the example shown in FIG. 2, the elements included in the input vector qi are a value of an input signal start, a value of a state control register state, and values of two data registers u, v.

It is noted that in the typical RTL code as shown in FIG. 2, condition decisions, such as if-then-else statements and case-switch statements, are generally included.

Figure 3:
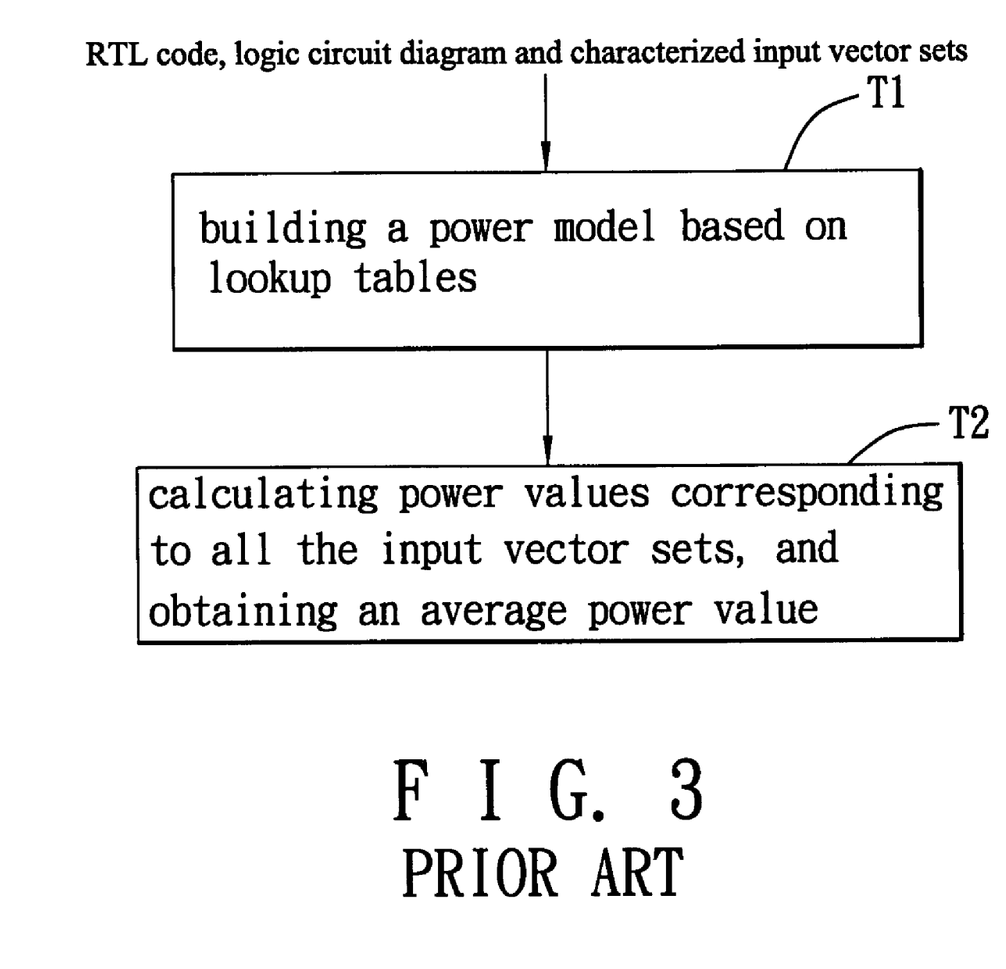
FIG. 3 is a flowchart of a conventional RTL power estimation method in chip design.

Reference is made to FIG. 3, which illustrates a conventional RT-level power estimation method. This method was proposed in the paper entitled "Clustered Table-Based Macromodels for RTL Power Estimation" in Proc. of Great Lake Symposium on VLSI by R. Corgnati, E. Macii, and M. Poncino in 1999. The aforesaid method includes the following steps.

In step T1, a power model is built based on the RTL code, logic circuit diagram, and characterized input vector sets of a chip. The building of the power model involves a plurality of look-up tables to record all each switching activity to be generated by the logic chip. The size of the look-up tables is determined based on the number of the input signals of the chip, and increases exponentially according to the number of input signals.

In step T2, the model built in step T1 is used to calculate, one by one, the power values to which all the meaningful input vector sets of the logic chip correspond, and an arithmetic mean of the power values thus obtained is calculated to obtain an average power value representative of the logic chip.

Since such a conventional RT-level-based method is simpler than the logic computations included in the logic gate level of the chip, it takes less computing time compared to power estimation at the gate level. However, with the advance of technology, the number of circuits within a chip is becoming larger and larger. When the functionality of the chip becomes so complicated that the number of input signals becomes large, the lookup tables adopted by the prior art will become so large that the aforesaid method will become impracticable.

In addition, the lookup table-based method fails to take into account that some conditional expressions are often used at the RTL code design stage of the logic chip, and these conditional expressions will cause the logic operation modes of the chip to vary with different combinations of the input signals. For example, the logic chip may perform a simple logic operation mode at one input signal combination, and a complicated multiplication operation mode at another input signal combination. Different operation modes indicate that the circuit will have different switching activities, and different switching activities will consume different amounts of power to result in the occurrence of varying power modes. Therefore, using such a method to estimate power consumption of a chip will result in substantial errors.

In sum, the conventional method ignores the diversity of operation modes of large logic chips, and the frequencies of occurrence of the operation modes may vary to a great extent with different input signals, so that the frequencies of the induced power mode are very different. In addition, when the operational clock frequency is increased, or when the control signals and data signals become more complicated, such a difference will become more obvious, thereby resulting in relatively large errors during power estimation.

SUMMARY OF THE INVENTION

Therefore, the object of this invention is to provide a method and computer program product for register transfer level power estimation in chip design. The method and computer program product have a high accuracy and can be adapted for use in large logic chips.

Accordingly, in a method for register transfer level power estimation in chip design of this invention, a chip is designed using a register transfer level code. The specification of the chip records all functional input vector sets that can be used to represent activities of the chip, each input vector set including input vectors in two consecutive clock cycles. The power estimation method includes:

(A) parsing all possible condition branches of conditional statements in the register transfer level code, and constructing a hierarchy tree to describe power modes that may be induced by each possible condition branch, the hierarchy tree having a plurality of levels and a plurality of nodes, each level being able to branch into different nodes based on the conditional statements in the register transfer level code, the nodes branching last therefrom corresponding respectively to all the power modes of the chip;

(B) selecting at least one representative input vector set from input vector sets recorded in the chip specification for each of the power modes established in step (A) based on frequencies of occurrence of the power modes, a larger number of input vector sets being selected for those power modes that have a higher frequency of occurrence, and constructing corresponding linear characterization formulas based on the selected input vector sets; and (C) inspecting each of the input vector sets recorded in the chip specification one by one, calculating the power modes corresponding to the input vector sets through the hierarchy tree instep (A), calculating power values from the linear characterization formulas constructed in step (B) which correspond to the power modes, and obtaining an average of sums of the power values of the input vector sets to represent the average power consumed by the chip.

The computer program product includes three program codes. These program codes enable a computer to execute the aforesaid three steps. That is, the first program code segment is for executing step (A), the second program code segment is for executing step (B), and the third program code segment is for executing step (C)

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 4:
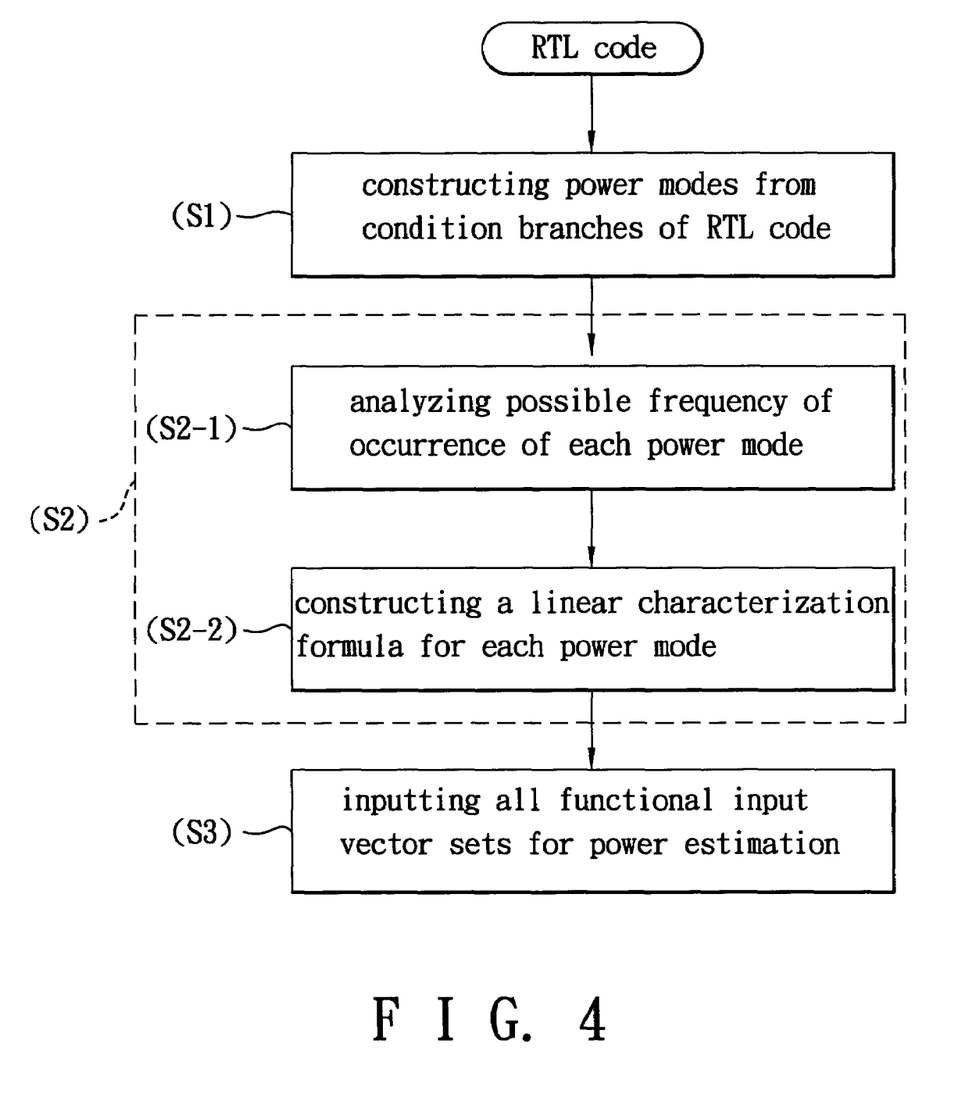
FIG. 4 is a flowchart of a preferred embodiment of an RTL power estimation method in chip design according to this invention.

Referring to FIG. 4, the preferred embodiment of a method and computer program product for register transfer level (RTL) power estimation in chip design according to this invention are shown to include the following steps:

In step S1, an RTL code for a logic chip is read, all possible condition branches of conditional statements in the RTL code are parsed, and power modes that may be induced by each possible condition branch are constructed. Each power mode represents the state transition that the logic chip may possibly generate, the computations generated in the logic chip, and switching activities among logic gate circuits.

Furthermore, in this embodiment, the power modes of each possible condition branch in the RTL code are constructed in the form of a hierarchy tree in step S1. The hierarchy tree has a plurality of levels and a plurality of nodes. Each level of the hierarchy tree can branch into different nodes according to the input vectors and condition decisions in the RTL code. The elements of the input vector set include external input signals of the logic chip, and output signals of all internal registers. The nodes that branch last from the hierarchy tree and that are located at the bottommost end correspond respectively to all possible power modes that may occur in the logic chip.

Take the RTL code listed in FIG. 2 as an example. Using the method of step S1 to process the RTL code in FIG. 2, the input vectors of the RTL code can be analyzed as including a value of an input signal start, a value of a state control register state, and values of two data registers u, v. Besides, in step S1, a hierarchy tree such as that shown in FIG. 5 can be constructed by parsing the changes of the input vectors during different clock cycles.

Figure 5:
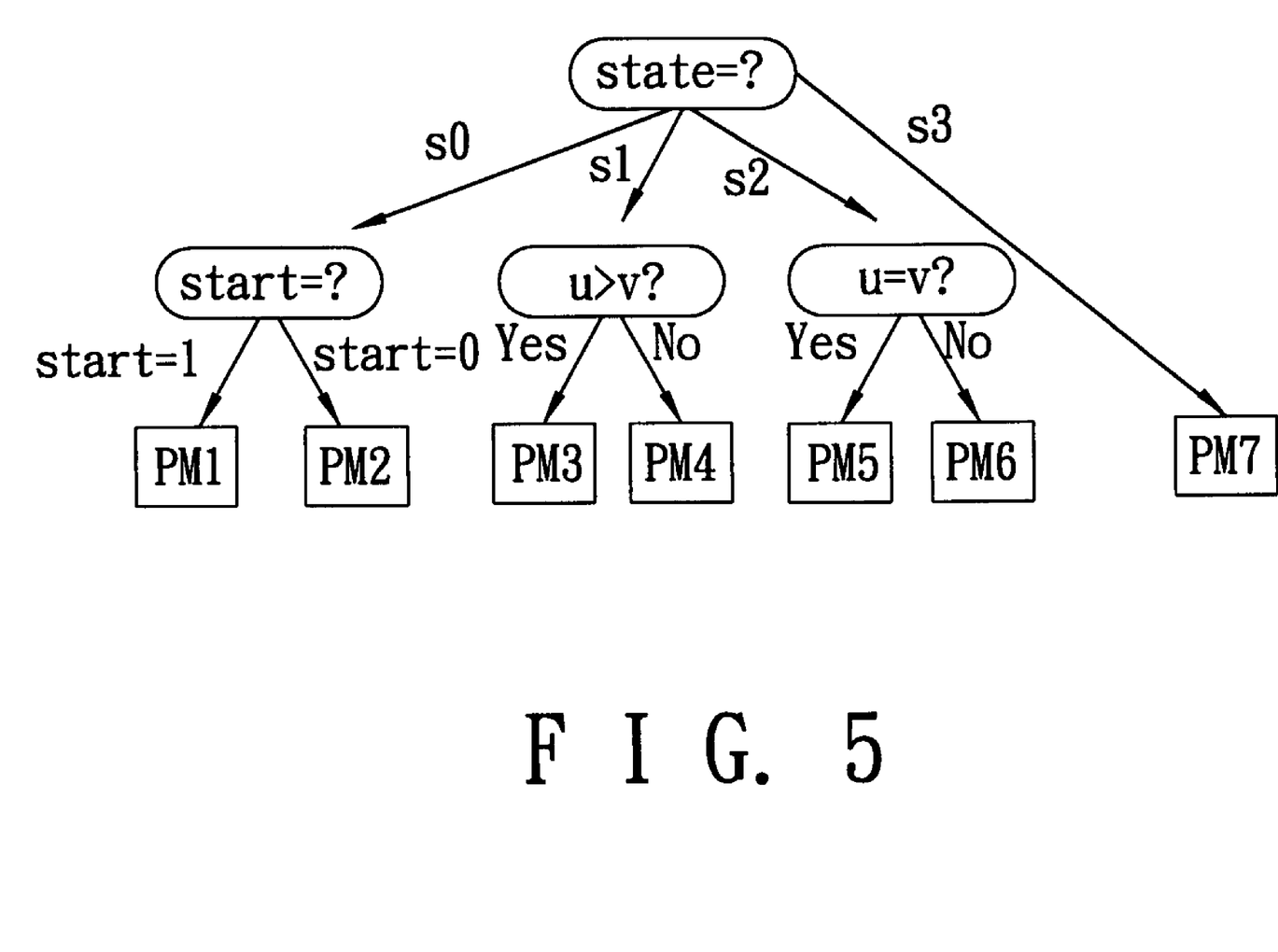
FIG. 5 is a power mode analysis diagram, illustrating the power modes analyzed from the RTL code of FIG. 2.

The first level of the hierarchy tree in FIG. 5 is to determine the value of the state control register state. Since the state control register state records the current state of the logic chip, which can be any one of four states s0, s1, s2, s3, the first level of the hierarchy tree can branch into four nodes, which correspond respectively to the values s0, s1, s2, and s3 of the state control register state.

In the hierarchy tree, the node at which the value of the state control register state is s0 may produce two new nodes based on whether the input signal start is 0. The two new nodes will not branch into other nodes, and are therefore classified as power modes PM1, PM2. In addition, in the hierarchy tree, the nodes at which the values of the state control register state are s1 and s2 may respectively generate new nodes based on the relative sizes of the data registers u, v. These new nodes are classified as power modes PM3, PM4, and PM5, PM6, respectively. Furthermore, in the hierarchy tree, the node at which the value of the state control register state is s3 will not generate new branches, and is therefore directly classified as power mode PM7.

Thus, when the input vector set inputted into the logic chip changes, i.e., an input vector changing into another input vector, a power mode can be obtained based on the signal value in the new input vector and following the classification flow of the hierarchy tree. Therefore, an input vector set including two input vectors will decide a condition branch of the RTL code to thereby induce a power mode, and to induce switching of the logic gates of the logic chip and the output values of the registers.

Because the hierarchy tree is obtained based on the RTL code of the logic chip, the power modes that can be generated by the logic chip can be fully listed one by one. However, it should be noted that, while every possible condition branch is presented in the form of a hierarchy tree in this embodiment, it is not limited thereto in actual practice. Other classification diagrams or state diagrams that can clearly identify each condition branch can also be used.

Referring back to FIG. 4, step S2 includes two sub-steps.

In sub-step S2-1, the frequencies of occurrence of the power modes caused by all functional input vector sets provided by the chip specification or the chip designer are analyzed.

Using the hierarchy tree shown in FIG. 5 as an example, if there are altogether 10,000 sets of input vectors in this embodiment, by analyzing the conditional statements of the RTL code according to step S2-1, it can be found that frequencies of occurrence of the power modes PM1, PM2, PM3, PM4, PM5, PM6, and PM7 are 1,000, 1,000, 2,000, 2,000, 1,000, 2,000, and 1,000, respectively, and that there are respectively 1,000, 1,000, 2,000, 2,000, 1,000, 2,000, and 1,000 input vector sets that will induce power modes PM1, PM2, PM3, PM4, PM5, PM6 and PM7. Therefore, it can be determined that the frequency of occurrence of power modes PM3, PM4 and PM6 is higher than that of other power modes.

In sub-step S2-2, for each power mode in step S1, a representative input vector set is selected, and the toggle count of the logic gates in the logic circuit and of the output signals of the registers of the chip during switching of each input signal in each input vector set is calculated. Based on the calculated toggle count, a linear characterization formula corresponding to each power mode is constructed, and these linear characterization formulas can be used to respectively calculate the power consumption values of the logic chip under the different power modes.

Figure 6:
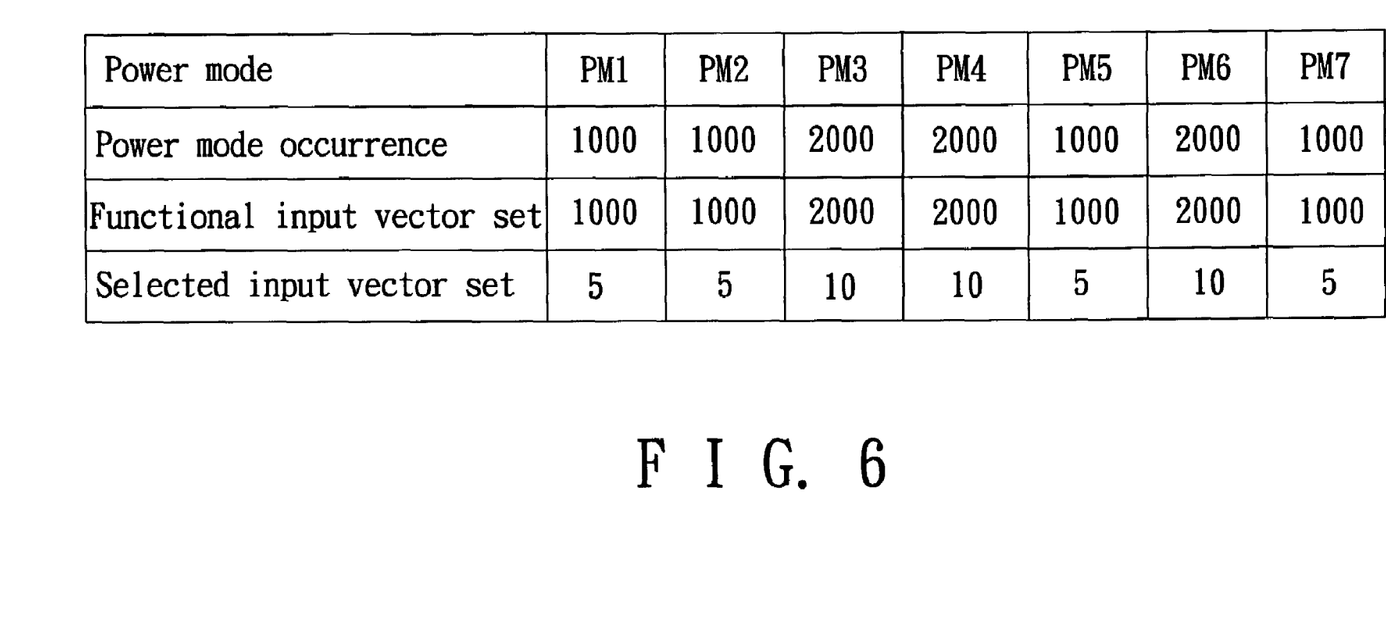
FIG. 6 is a power mode occurrence frequency chart, illustrating that frequency of occurrence of each power mode obtained by analyzing the RTL code from all functional input vector sets.

If there are NFP sets of functional input vector sets, supposing there are altogether TP input vector sets selected in sub-step S2-2, and the number of occurrence of power mode PMi is f, (f/NFP)×TP input vector sets are selected at random for the power mode PMi. Referring to FIGS. 5 and 6, supposing there are respectively 1,000, 1,000, 2,000, 2,000, 1,000, 2,000 and 1,000 input vector sets that will induce power modes PM1, PM2, PM3, PM4, PM5, PM6, and PM7, and if a total of 50 input vector sets are to be selected in step S2-2, then 5, 5, 10, 10, 5, 10, and 5 input vector sets are correspondingly selected.

It is worth noting that in sub-step S2-2, the selection of a plurality of input vector sets is decided based on the frequencies of occurrence determined in sub-step S2-1. That is, more input vector sets are selected for those power modes with a higher frequency of occurrence, and at least one input vector set is selected for those power modes with a lower frequency of occurrence.

A linear characterization formula $\Omega_i$ for describing a power mode PMi is as shown in equation (1), and the value calculated from equation (1) stands for the power consumed by the logic chip in the power mode PMi.

$$\Omega_i = C_{i1}V_{i1} + C_{i2}V_{i2} + \ldots + C_{in}V_{in} \qquad \text{equation (1)}$$

where $V_{i1} \ldots V_{in}$ respectively represent whether input signals $x_1 \ldots x_n$ included in the input vector set of the power mode PMi have switching activities. If there is switching activity of the input signal $x_n$ from 1→0 or from 0→1, then $V_{in}$ is 1 and is otherwise 0. $C_{i1} \ldots C_{in}$ in the equation correspond respectively to weighting factors of $V_{i1} \ldots V_{in}$. When the weighting factor to which an input signal corresponds is large, this indicates that a switching activity of the input signal will produce a relatively large power consumption within the logic chip.

$C_{in}$ is calculated in the manner as set forth in equation (2):

$$C_{in} = \left(\sum_{k=1}^{m} C_{in}(k)\right) / m \qquad \text{equation (2)}$$

where m is the number of representative input vector sets selected when constructing equation (1), and $C_{in}(k)$ is obtained in a manner as shown in equation (3):

$$C_{in}(k) = (\text{Fanout\_toggle\_}x_n(k))/(\text{Sum}(k)) \times (\text{Total\_toggle}(k)) \qquad \text{equation (3)}$$

where Fanout_toggle_$x_n(k)$ represents the toggle count of logic gates affected by the fan-out of the input signal $x_n$ of the kth input vector set, Total_toggle(k) represents the total toggle count of the logic gates within the circuit as produced by the kth input vector set, whereas Sum(k) represents the sum of the toggle counts of the logic gates affected by the fan-out of each input signal of the kth input vector set. Moreover, since the logic gates affected by the input signals $x_1 \ldots x_n$ of the kth input vector set may overlap, there is a division by Sum(k) in equation (2) so as to achieve the object of normalization.

Figure 7:
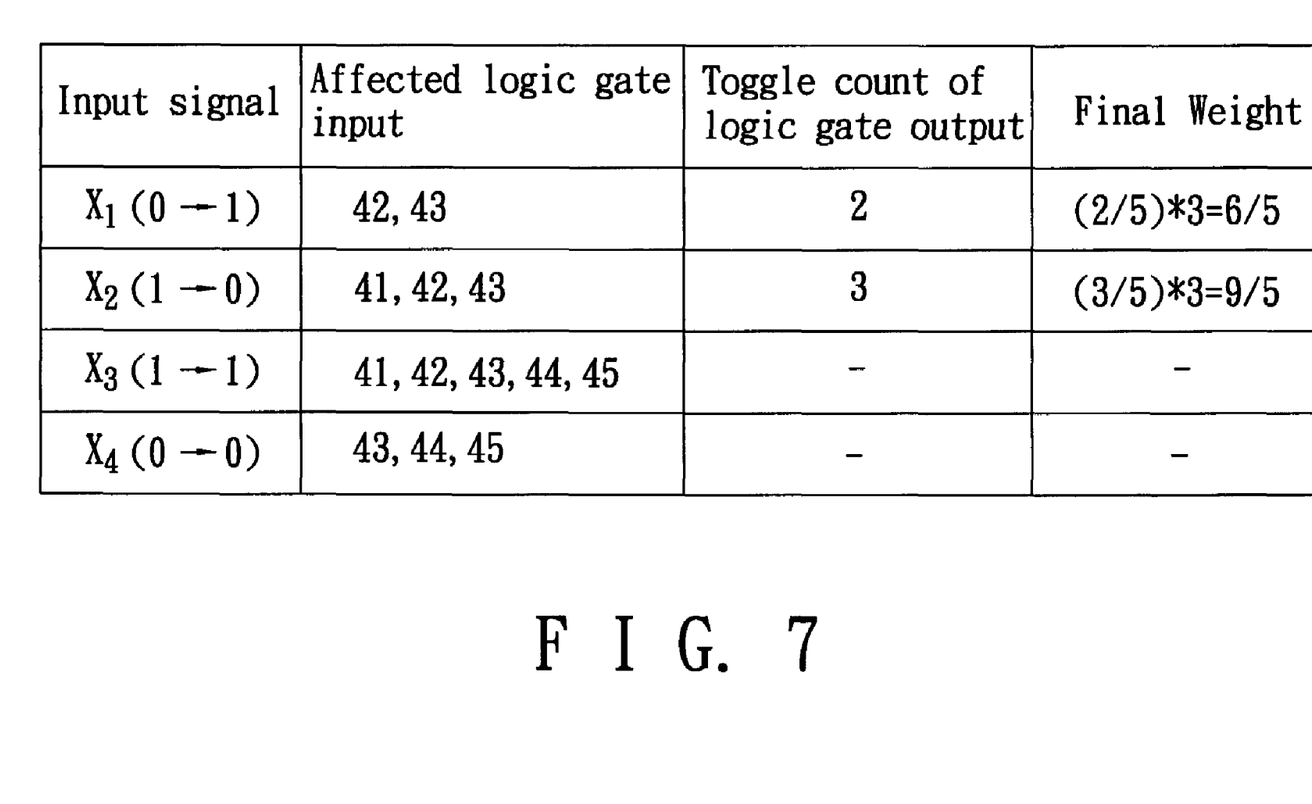
FIG. 7 is a final weight diagram, showing the estimated final weight corresponding to each input signal.

Referring to FIGS. 1 and 7, and using the logic circuit shown in FIG. 1 as an example, an input vector set includes four input signals $x_1$, $x_2$, $x_3$, $x_4$, and it is supposed that the values of the first input vector set $p_1$, $p_2$ selected for the power mode PM1 are [0, 1, 1, 0] and [1, 0, 1, 0], respectively. Therefore, there is toggling of the input signals $x_1$ and $x_2$ of the first input vector set, while there is no toggling of the input signals $x_3$ and $x_4$.

Moreover, the input signal $x_1$ has altogether affected the second NAND gate 42 and the first NOR gate 43, and the Fanout_toggle_$x_1(1)$ is therefore 2. The input signal $x_2$ has altogether affected the first and second NAND gates 41, 42, and the first NOR gate 43, and the Fanout_toggle_$x_3(1)$ is therefore 3. Hence, the value of Sum(1) is 5(=2+3+0+0). Since only the outputs of the first NOR gate 43, and the first and second NAND gates 41, 42 will toggle when the input vector set p1 is changed to the input vector set p2, the value of Total_toggle(1) is 3. Therefore, according to equation (3), the weighting factors of the input signals $X_1$ and $X_2$ are $C_{11}(1)=6/5$ and $C_{12}(1)=9/5$, respectively, whereas the weighting factors $C_{13}(1)$ and $C_{14}(1)$ of the input signals $X_3$ and $X_4$ are 0.

In the foregoing, a value 1 is given when the output of a logic gate has a switching activity, and a value 0 is given when there is no switching activity. However, for some relatively important logic gates, such as those logic gates that are predicted by the chip designer to have a large output load capacitance, the values representing toggling of the outputs thereof can be increased to, e.g., 2 or 3, and are not to be represented by 1 only.

Therefore, if a value 2 is given when the output of the first NAND gate 41 of FIG. 1 toggles, then Sum(1) will become (2+1)+(2+1+1)=7, and Total_toggle(1) will be equal to 2+1+1=4. Thus, the weighting factors that correspond to the input signal $x_1$ and $x_2$ are $C_{11}(1)=(2+1)/7 \times 4=12/7$ and $C_{12}(1)=(2+1+1)/7 \times 4=16/7$, respectively.

The corresponding weighting factors $C_{11}(1)$, $C_{12}(1)$, $C_{13}(1)$, and $C_{14}(1)$ of the first input vector set have thus been calculated as described hereinabove. If the number of selected input vector sets used in calculating the power mode PM1 is 3, it is necessary to calculate these three input vector sets one by one in the aforesaid manner so as to further obtain $C_{11}(2) \sim C_{14}(2)$ and $C_{11}(3) \sim C_{14}(3)$.

After calculating $C_{11}(1) \sim C_{14}(1)$, $C_{11}(2) \sim C_{14}(2)$, and $C_{11}(3) \sim C_{14}(3)$, $C_{11}$, $C_{12}$, $C_{13}$, and $C_{14}$ can be calculated based on equation (2). $C_{11}$ will be the arithmetic mean of $C_{11}(1)$, $C_{11}(2)$ and $C_{11}(3)$; $C_{12}$ will be the arithmetic mean of $C_{12}(1)$, $C_{12}(2)$ and $C_{12}(3)$; and so on and so forth for $C_{13}$ and $C_{14}$.

Herein, for the calculation of $C_{in}$ from a number m of obtained $C_{in}(k)$, other methods such as linear regression and least mean square can also be used to obtain a preferred $C_{in}$.

In addition, for power mode PM1, if the last obtained weighting factor $C_{14}$ of the input signal $x_4$ is 0, this would totally disregard the effect of the input signal $x_4$ on power consumption in equation (1). However, even if the input signal $x_4$ has a relatively small effect on power consumption in comparison with $x_1$, $x_2$ and $x_3$, the input signal $x_4$, which has not been modelized, should still be taken into consideration. In this embodiment, when the weighting factor calculated based on equation (2) is 0, an arithmetic mean of the non-zero weighting factors of the input signal $x_4$ in the other power modes will be used as the weighting factor of the input signal $x_4$ in the power mode PM1.

Since the number of input signals in a chip of general size is many, and since chances that the weighting factor is 0 is small, the accuracy of the power estimation method according to this invention is still very high. In addition, while a logic chip may have many power modes, some of the power modes have a very low frequency of occurrence, and the logic chip generally switches among several power modes that frequently occur. Accordingly, the linear characterization formulas are constructed primarily based on power modes that have a higher frequency of occurrence in sub-step S2-2. Therefore, the simulation results can be more accurate.

In addition, although the linear characterization formulas are constructed in sub-step S2-2 based on equations (1)-(3), simple modifications relevant to equations (1)-(3) and equations that do not depart from the spirit of this invention should also fall within the scope of protection of this invention. For instance, the normalization in equation (3) can be omitted.

It is particularly noted herein that, in sub-step S2-2, although the linear characterization formulas are derived based on the gate-level, since they are constructed using a small number of representative input vector sets in this step, and since they are constructed primarily based on the power modes with a higher frequency of occurrence in the logic chip, the method of this invention will not be time-consuming, and the simulation results can be more accurate.

Referring back to FIG. 4, the linear characterization formulas $\Omega_1 \sim \Omega_r$ for the power modes PM1~PMr have been constructed in sub-step S2-2, as set forth in equation (4). Then, in step S3, all the possible input vector sets that are meaningful for the logic chip are substituted into the corresponding linear characterization formulas one by one so as to obtain corresponding power values. Finally, an arithmetic mean of all the calculated power values is obtained to represent an average power consumed by the logic chip.

$$\Omega_1 = C_{11}V_{11} + C_{12}V_{12} + C_{13}V_{13} + \ldots + C_{1n}V_{1n}$$

$$\Omega_2 = C_{21}V_{21} + C_{22}V_{22} + C_{23}V_{23} + \ldots + C_{2n}V_{2n}$$

$$\Omega_3 = C_{31}V_{31} + C_{32}V_{32} + C_{33}V_{33} + \ldots + C_{3n}V_{3n}$$

$$\Omega_r = C_{r1}V_{r1} + C_{r2}V_{r2} + C_{r3}V_{r3} + \ldots + C_{rn}V_{rn} \qquad \text{equation (4)}$$

Therefore, if all the functional input vector sets provided by the designer of a logic chip are 10,000 sets, in step S3, it is only necessary to find out 10,000 power values of the 10,000 input vector sets based on equation (4). Finally, an arithmetic mean value of the 10,000 power values is estimated to represent the average power consumption of the logic chip.

In addition, it is noted that although a large number of input vector sets have to be processed in step S3, e.g., calculating the power values of the aforesaid 10,000 entries one by one based on equation (4), since step S3 merely involves arithmetic operations, it does not require any circuit simulation to determine logic gate toggling, and is therefore not time-consuming.

Furthermore, a logic chip generally includes many different types of smaller modules. Each module executes a small portion of a specific function of the logic chip, and has a corresponding RTL code. However, the RTL code of the logic chip is substantially a collection of the RTL codes of all the modules. Thus, in step S1, the corresponding RTL codes of the modules in the logic chip can be parsed respectively to establish all the power modes of the modules. Therefore, this invention not only has wide adaptability, it is also scalable.

The preferred embodiment of a computer program product according to this invention includes four program codes, and these program codes can cause a computer to execute four steps. That is, the first program code can cause execution of step S1, the second program code can cause execution of sub-step S2-1, the third program code can cause execution of sub-step S2-2, and the fourth program code can cause execution of step S3.

In view of the foregoing, the method and computer program product for RTL power estimation in chip design according to this invention include constructing a hierarchy tree that can describe each power mode based on the RTL code, and selecting a larger number of input vector sets for power modes that occur more frequently to perform circuit analysis at the gate level and to construct linear characterization formulas for power consumption to thereby enhance the accuracy of this method. In addition, the linear characterization formulas include the corresponding weighting factors of the input signals. These weighting factors can correctly reflect the effect of switching the corresponding input signals upon signal toggling within the logic circuit. Further, since the linear formulas merely include simple operations, when the functionality of the logic chip increases to result in enlargement and complication of the circuits so that the number of input signals becomes large, the linear formula model is still very convenient and accurate in terms of calculation.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A method for register transfer level power estimation in chip design, a chip being designed using a register transfer level code, the specification of the chip recording all functional input vector sets used to represent activities of the chip, each input vector set including input vectors in two consecutive clock cycles, the method comprising:
(A) parsing all possible condition branches of conditional statements in the register transfer level code, and constructing a hierarchy tree to describe power modes that is inducible by each possible condition branch, the hierarchy tree having a plurality of levels and a plurality of nodes, each level being branchable into different nodes based on the conditional statements in the register transfer level code, the nodes branching last therefrom corresponding respectively to all the power modes of the chip;
(B) selecting a plurality of representative input vector sets from input vector sets recorded in the chip specification for each of the power modes established in step (A) based on frequencies of occurrence of the power modes, a larger number of input vector sets being selected for those power modes that have a higher frequency of occurrence, and constructing corresponding linear characterization formulas based on the selected input vector sets; and
(C) inspecting each of the input vector sets recorded in the chip specification one by one, calculating the power modes corresponding to the input vector sets through the hierarchy tree in step (A), calculating power values from the linear characterization formulas constructed in step (B) which correspond to the power modes, and obtaining an average of sums of the power values of the input vector sets to represent the average power consumed by the chip,
wherein, in step (B), the linear characterization formulas are constructed based on a count of logic gates in a logic circuit and of output signals of registers of the chip which toggle as a result of switching of each of the input signals in the selected input vector set.

2. The method according to claim 1, wherein, in step (B), the plurality of representative input vector sets are selected in random, and the numbers of input vector sets used to construct the linear characterization formulas are in direct proportion to the frequencies of occurrence of the power modes.

3. The method according to claim 1, wherein the linear characterization formula $\Omega_i$ of each of the power modes PMi is constructed based on the following equation, i being a positive integer, the value of i being identical to the number of the power mode to be generated by the chip:

$$\Omega_i = C_{i1}V_{i1} + C_{i2}V_{i2} + K + C_{in}V_{in}$$

where $V_{i1}$ K $V_{in}$ respectively represent whether toggling of the input signals $x_1$ K $x_n$ included in the input vector set of the power mode PMi occurs, $V_{in}$ being 1 if the input signal $x_n$ has a switching activity from 1→0 or from 0→1 and being otherwise 0, whereas $C_{i1}$ K $C_{in}$ correspond respectively to weighting factors of $V_{i1}$ K $V_{in}$.

4. The method according to claim 3, wherein the weighting factors, $C_{i1}$ K $C_{in}$ are calculated as follows:

$$C_{in} = \left(\sum_{k=1}^{m} C_{in}(k)\right) \bigg/ m$$

where m is the number of the selected input vector sets when the linear characterization formula $\Omega_i$ was constructed for the power mode PMi, and $C_{in}(k)$ is calculated as follows:

$$C_{in}(k) = (\text{Fanout\_toggle}\_x_n(k))/(\text{Sum}(k)) \times (\text{Total\_toggle}(k))$$

where Fanout_toggle $x_n(k)$ represents the toggle count of logic gates affected by the fan-out of the input signal $X_n$ of a kth input vector set, and Total_toggle(k) represents the total toggle count of the logic gates within the circuit as produced by the kth input vector set, whereas Sum(k) represents sum of the toggle counts of the logic gates affected by the fan-out of each of the input signals of the kth input vector set, a non-zero positive integer being given when the output of a logic gate has a switching activity, a value 0 being given when there is no switching activity.

5. The method according to claim 4, wherein the weighting factor $C_{in}$ is calculated from a number m of the obtained $C_{in}(k)$ using linear regression.

6. The method according to claim 4, wherein the weighting factor $C_{in}$ is calculated from a number m of the obtained $C_{in}(k)$ using least mean square.

7. A computer program product comprising a computer-readable medium to enable a computer to execute steps of a method for register transfer level power estimation in chip design, a chip being designed with a register transfer level code, the specification of the chip recording all functional input vector sets used to represent activities of the chip, each input vector set including input vectors in two consecutive clock cycles, said computer-readable medium comprising:
  a first program code for causing the computer to parse all possible condition branches of conditional statements in the register transfer level code, and to establish power modes inducible by every possible condition branch using a hierarchy tree, the hierarchy tree having a plurality of levels and a plurality of nodes, each level being branchable into different nodes based on the conditional statements in the register transfer level code, the nodes branching last therefrom corresponding respectively to all the power modes of the chip;
  a second program code for causing the computer to select a plurality of representative input vector sets from input vector sets recorded in the chip specification for each of the power modes based on frequencies of occurrence of the power modes, a larger number of input vector sets being selected for those power modes that have a higher frequency of occurrence, and for causing the computer to construct corresponding linear characterization formulas based on the selected input vector sets; and
  a third program code for causing the computer to inspect each of the input vector sets recorded in the chip specification one by one, to calculate the power modes corresponding to the input vector sets through the hierarchy tree, to calculate power values from the constructed linear characterization formulas, and to obtain an average of sums of the power values of the input vector sets to represent the average power consumed by the chip,
  wherein, in the second program code, the linear characterization formulas are constructed based on a count of logic gates in a logic circuit and of output signals of registers of the chip which toggle as a result of switching of each of the input signals in the selected input vector set.

8. The computer program product according to claim 7, wherein, in the second program code, the plurality of representative input vector sets are selected in random, and the numbers of input vector sets used to construct the linear characterization formulas are in direct proportion to the frequencies of occurrence of the power modes.

9. The computer program product according to claim 7, wherein the linear characterization formula $\Omega_i$ of each of the power modes PMi is constructed based on the following equation, i being a positive integer, the value of i being identical to the number of the power mode to be generated by the chip:

$$\Omega_i = C_{i1}V_{i1} + C_{i2}V_{i2} + K + C_{in}V_{in}$$

where $V_{i1} K V_{in}$ respectively represent whether toggling of the input signals $x_1 K x_n$ included in the input vector set of the power mode PMi occurs, $V_{in}$ being 1 if the input signal $x_n$ has a switching activity from 1→0 or from 0→1 and being otherwise 0, whereas $C_{i1} K C_{in}$ correspond respectively to weighting factors of $V_{i1} K V_{in}$.

10. The computer program product according to claim 9, wherein the weighting factors $C_{i1} K C_{in}$ are calculated as follows:

$$C_{in} = \left(\sum_{k=1}^{m} C_{in}(k)\right)/m$$

where m is the number of the selected input vector sets when the linear characterization formula $\Omega_i$ was constructed for the power mode PMi, and $C_{in}(k)$ is calculated as follows:

$$C_{in}(k) = (\text{Fanout\_toggle\_}x_n(k))/(\text{Sum}(k)) \times (\text{Total\_toggle}(k))$$

where Fanout_toggle_$x_n$(k) represents the toggle count of logic gates affected by the fan-out of the input signal $x_n$ of a kth input vector set, and Total_toggle(k) represents the total toggle count of the logic gates within the circuit as produced by the kth input vector set, whereas Sum(k) represents sum of the toggle counts of the logic gates affected by the fan-out of each of the input signals of the kth input vector set, a non-zero positive integer being given when the output of a logic gate has a switching activity, a value 0 being given when there is no switching activity.

11. The computer program product according to claim 10, wherein the weighting factor $C_{in}$ is calculated from a number m of the obtained $C_{in}(k)$ using linear regression.

12. The computer program product according to claim 10, wherein the weighting factor $C_{in}$ is calculated from the number m of the obtained $C_{in}(k)$ using least mean square.

* * * * *